Sept. 12, 1939.  G. E. DANIELS  2,172,672
DIRT SCRAPER
Filed Sept. 13, 1937   5 Sheets-Sheet 1
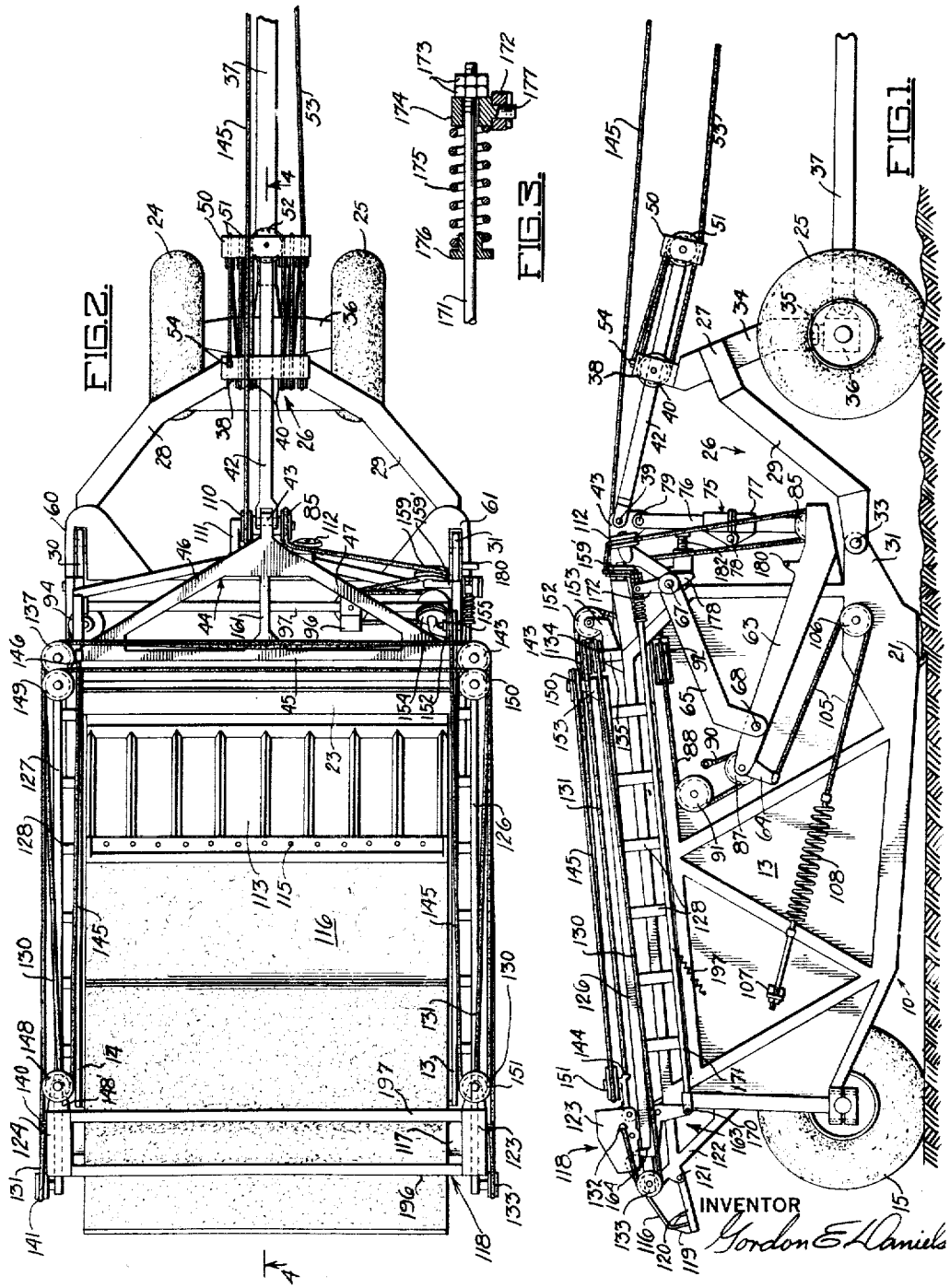
INVENTOR
Gordon E. Daniels

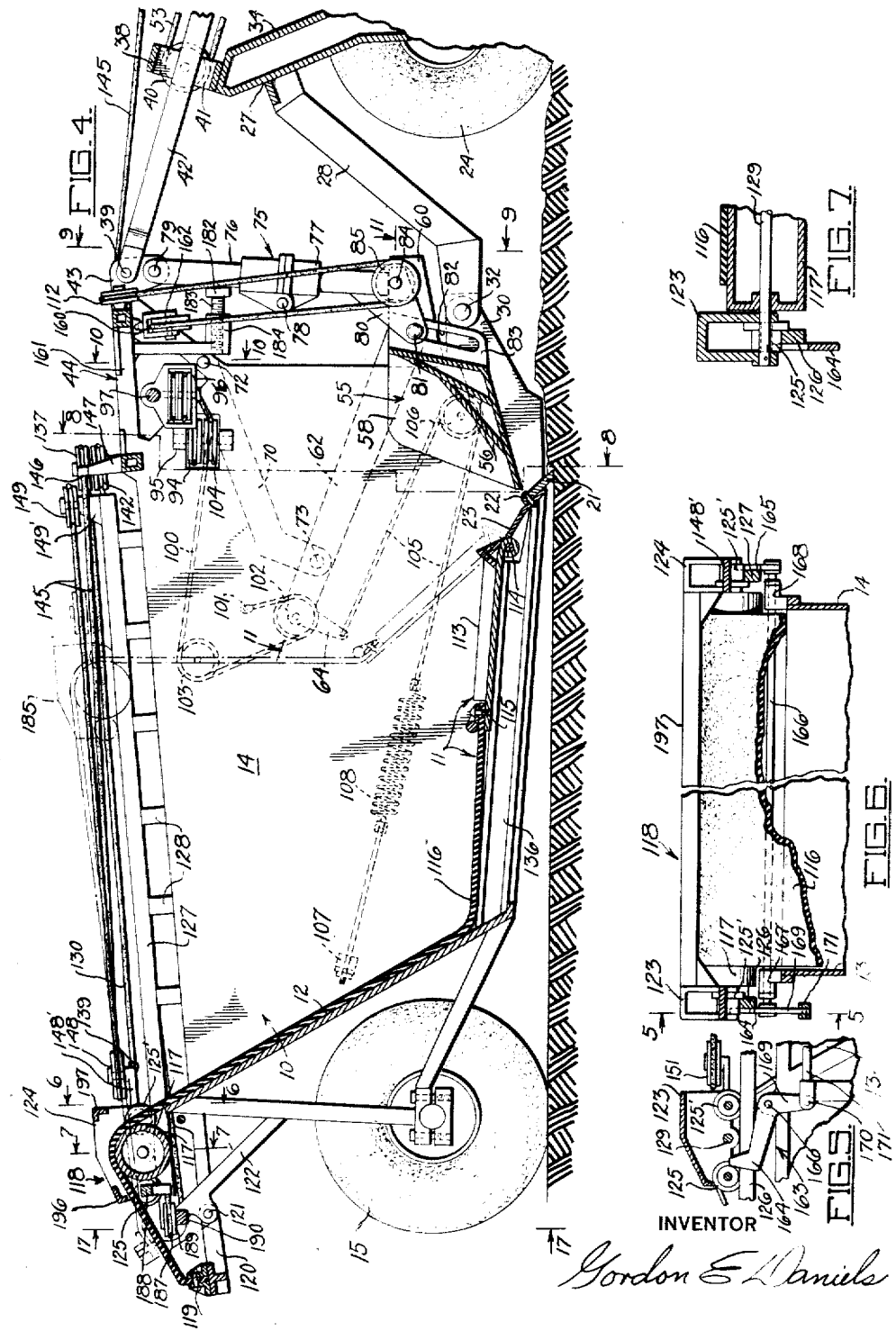

Sept. 12, 1939.   G. E. DANIELS   2,172,672
DIRT SCRAPER
Filed Sept. 13, 1937   5 Sheets-Sheet 3

INVENTOR
Gordon E. Daniels

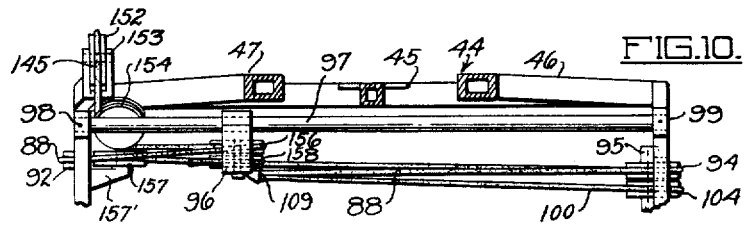
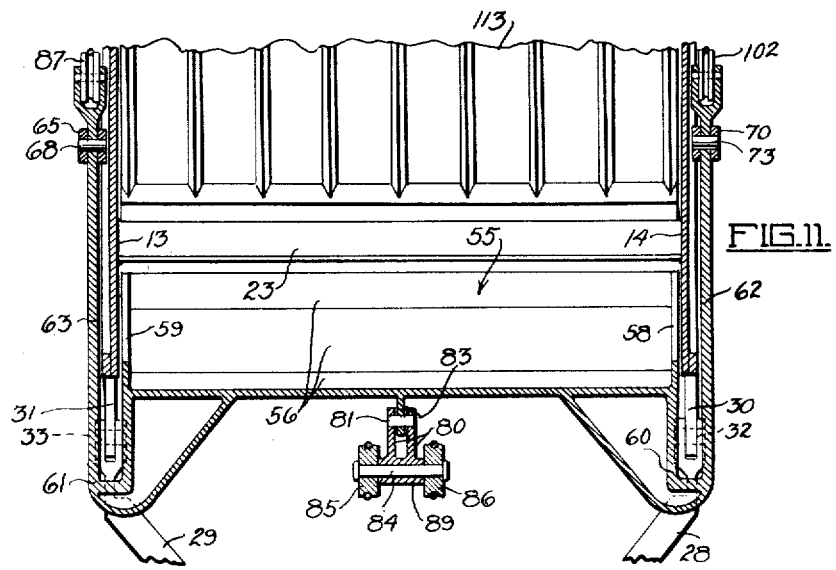
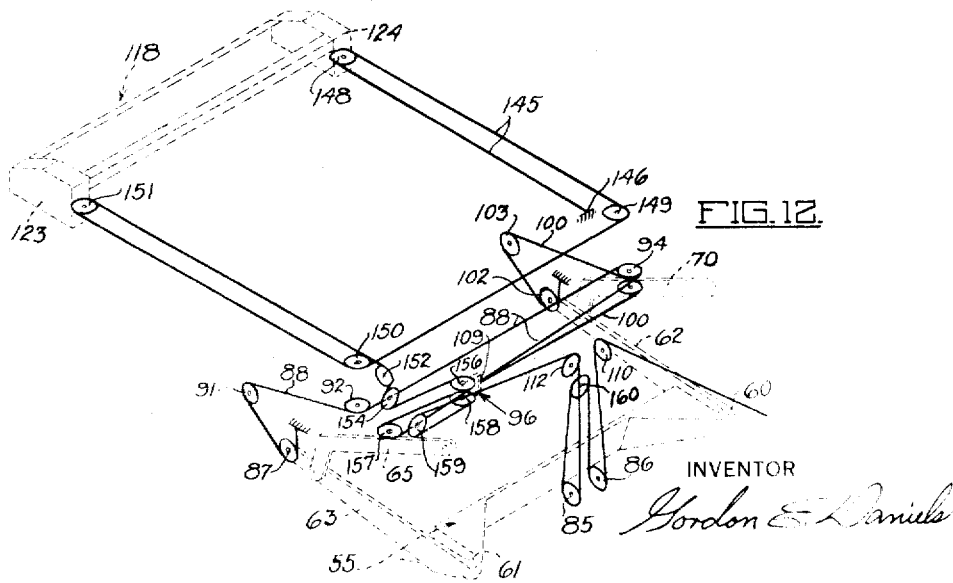

Sept. 12, 1939.　　　G. E. DANIELS　　　2,172,672
DIRT SCRAPER
Filed Sept. 13, 1937　　　5 Sheets-Sheet 5

INVENTOR
Gordon E. Daniels

Patented Sept. 12, 1939

2,172,672

UNITED STATES PATENT OFFICE 2,172,672

DIRT SCRAPER

Gordon E. Daniels, Los Angeles, Calif.

Application September 13, 1937, Serial No. 163,540

22 Claims. (Cl. 37—126)

This invention relates to dirt scrapers for use in leveling ground for roads and the like, and has particular reference to scrapers of the type wherein a dirt accumulating body, having a transversely extending cutting or scraping edge associated with the bottom thereof, is dragged over the ground to be scraped. The dirt is directed into the body, during the scraping operation, due to the forward movement of the scraper, and is retained therein until a place is reached where it is to be dumped.

Heretofore scrapers of the above type have been seriously limited in size, due to the fact that the material scraped has a tendency to accumulate directly above the cutting edge, and to overflow around the front and sides of the scraper body without filling the rear thereof. The above disadvantage has resulted in the construction of scrapers of relatively small dirt capacity, at least as far as the length of the accumulating body, extending rearwardly of the cutting edge is concerned. This limitation in size necessitates frequent time consuming trips to convey a loaded scraper to a place where the dirt or other scraped material is to be dumped. A compromise for this condition has heretofore been effected by arranging a plurality of scrapers in tandem, one behind the other, and pulling the lot by means of a tractor or other tractive device. However, this results in an expensive arrangement of a number of scraper units, the operation of which is difficult to control by the tractor operator from a single operating station, namely the tractor, while the units are being moved during the scraping operation.

A further difficulty heretofore experienced, which is also due to the above noted accumulation of dirt directly above the cutting edge, is the settling or packing of the dirt to such an extent as to clog the cutting edge, preventing the edge from biting or cutting into the dirt and thus preventing any further movement of the dirt upward into the scraper body.

It therefore becomes one object of the present invention to increase the capacity of a dirt scraper.

A further object of the invention is to prevent the packing of scraped material directly above the cutting edge of a scraper.

A further object of the invention is to facilitate removal of scraped material from a scraper body.

A further object is to reduce the force necessary to remove scraped material from a scraper body.

A still further object of the invention is to obtain common operation of a crowding mechanism and material removing means.

A still further object of the invention is to retain the crowding mechanism in an inoperative and removed position during removal of the scraped material from the scraper body.

The above objects and others, which will be apparent from the following specifications taken in connection with the accompanying drawings forming a part thereof, are accomplished by providing a "crowder" member adjacent the cutting edge of the scraper body. The crowder member is supported for movement through a curvilinear path past the scraper cutting edge by a plurality of links pivotally connecting the same to the scraper body. A single cable when pulled is inoperatable to move the crowder member in such a path as to move the dirt or other material, accumulating adjacent the cutting edge, rearwardly into the scraper body. However, an important function of the crowder member is to loosen the packed or settled material thus preventing clogging of the cutting edge.

The dirt expelling or removing means comprises what I will term a "draper" adapted to be operated through the same cable which operated the crowder member. A differential pulley block arrangement is provided between the draper operating section and the crowder operating section of the cable to permit selective operation of either of these two mechanisms as desired. A suitable latch device, normally retaining the draper member in an inoperatable position, is adapted to be released on operation of the crowder member in a direction opposite that of its normal movement during the dirt shifting cycle.

The draper mechanism comprises a sheet of flexible or pliant material which forms part of the bottom and end walls of the scraper body; is attached to the bottom wall of the body, and is movable lengthwise of the scraper at the upper end thereof by means of a carriage adapted to be moved by the operating cable. On release of the draper retaining latch the carriage is drawn forward to produce a rolling action upon the material accumulated within the scraper thus moving the material toward the forward end of the body and over the cutting edge thereof. This rolling action requires a minimum expenditure of energy to expel the material from the body.

Although the novel features which are to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Fig. 1 is a side elevation view of a dirt scraper embodying the present invention;

Fig. 2 is a plan view of the scraper;

Fig. 3 is an enlarged sectional view of a portion of the one-way trip mechanism for releasing the draper retaining latch;

Fig. 4 is a sectional elevation view of the scraper, partly broken away and is taken along the lines 4—4 of Fig. 2;

Fig. 5 is a fragmentary sectional view illustrating the draper retaining latch mechanism and is taken in the direction of the lines 5—5 of Fig. 6;

Fig. 6 is a transverse sectional elevation view of the upper rear portion of the scraper body and draper carriage and is taken along the lines 6—6 of Fig. 4;

Fig. 7 is a fragmentary sectional view of one end of the draper carriage and is taken along the lines 7—7 of Fig. 4;

Fig. 10 is a transverse sectional elevation view of the forward upper portion only of the scraper body, illustrating the traveling differential pulley block, and is taken along the lines 10—10 of Fig. 4;

Fig. 11 is a sectional plan view taken through the forward end of the scraper body and the associated crowder member, and is taken along the lines 11—11 of Fig. 4;

Fig. 12 is a perspective diagrammatic view of the scraper illustrating the arrangement of the cables and pulleys for moving the crowder and draper mechanisms;

Figure 17:
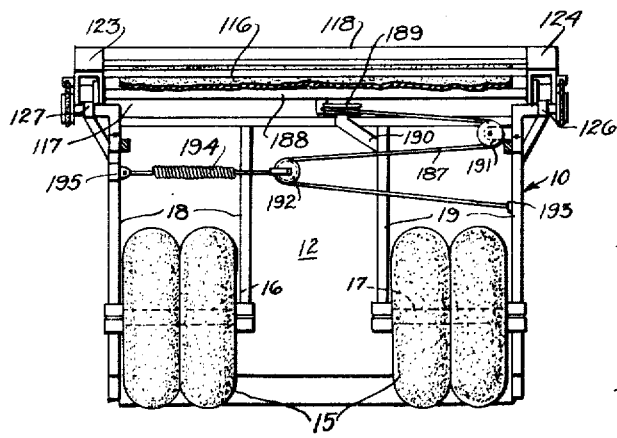

Figs. 13 to 16, inclusive, are diagrammatic views of the various crowder mechanism elements illustrating successive steps in the operation of the crowder member;

Fig. 17 is a rear sectional elevation view of the scraper and is taken along the lines 17—17 of Fig. 4.

Referring now to the drawings, the scraper comprises an accumulating body for dirt or the like material, and is generally indicated at 10. The body 10 comprises a bottom wall 11, and end wall 12, and side walls 13 and 14, respectively. The body 10 is supported at its rear end by means of a set of coaxial wheels 15 (Fig. 17) carried on shafts 16 and 17 secured in sets of brackets 18 and 19, respectively, extending from the rear of the body 10.

A transversely extending cutter or scraper bar 21 (Fig. 4) is provided at the lower forward end of the body 10 and is removably secured for sharpening, replacing, and the like to a transversely extending floor section 23 by bolts 22. Floor section 23 is rigidly secured, as by welding, at either end thereof to the side walls 13 and 14. As shown, the cutter bar 21 extends below the bottom level of the body 10 and has a cutting edge formed at the lower extremity thereof for the purpose of entering into the surface of the material to be scraped.

The forward end of the body 10 is carried by wheels 24 and 25 through a vertically adjustable mount, generally indicated at 26, for the purpose of adjusting the cutter bar 21 to any desired level in relation to the surface of the material being scraped. Referring in particular to Figs. 1, 2, and 4 the adjustable mount 26 comprises a tripod member 27 having a pair of diverging, rearwardly extending legs 28 and 29 pivotally secured at their lower ends to brackets 30 and 31 extending forwardly of the scraper sides 14 and 13, respectively, by means of coaxial pins 32 and 33, respectively. The remaining depending leg 34 of the tripod member 27 which is rigidly secured to the upper ends of the legs 28 and 29 is pivotally secured at 35 (Fig. 1) to a transversely extending axle member 36 to permit pivotal movement of such axle about a vertical axis. Axle 36 is journaled at either end thereof in the wheels 24 and 25. A draw-bar 37, pivotally secured at one end thereof to the axle 36, is adapted to be connected to any suitable source of prime mover, preferably a tractor (not shown).

Secured to the upper end of an upwardly extending portion of the leg 34 of the tripod 27 is a pulley block 38 having mounted therein a plurality of coaxial and individually rotatable pulleys 40, and having an enlarged opening 41 (Fig. 4) in the central portion thereof to slidably receive a strut 42. Strut 42 is bifurcated at its rear end and is pivotally secured thereat by a pin 39 to a bearing piece 43 secured in rigid relation to the scraper body 10 and forwardly thereof by a pyramidal bracket member 44 having its apex terminating in the piece 43, the other ends thereof being suitably formed integral with the forward ends of the scraper sides 13 and 14. The upper surface of the bracket 44 is formed triangularly in shape consisting of three structural members 45, 46, 47, the transversely extending member 45 serving to hold the upper ends of the sides 13 and 14 in rigid spaced relation with each other.

The strut 42 has secured at the forward end thereof a pulley block 50 having mounted therein a plurality of individually rotatable pulleys 51. A single pulley 52 located centrally of the block 50 is carried by the block for rotation about a vertical axis. A lifting cable 53 is secured at one end 54 to the pulley block 38 formed on the tripod member 27. A portion of the cable 53 is wound around the successive ones of the sets of pulleys 40 and 51 and 52 of the pulley blocks 38 and 50, respectively, in a helical fashion to form a block and tackle of sufficient mechanical advantage to permit the forward end of the scraper to be easily raised or lowered through a suitable power driven winch (not shown), preferably located on the tractor, to which winch the free end of the cable 53 is attached. When the cable 53 is drawn up the two blocks 38 and 50 are brought towards each other, causing the upper end of the tripod leg 34 to move forwardly and thus, through the remaining legs 28 and 29, raise the forward end of the scraper including the cutter bar 21.

While the scraper is in cutting or in scraping position the cable 53 is regulated so as to adjust the cutter bar 21 to any particular level depending upon the condition of the material being scraped, the speed at which the scraper is being drawn over the surface of the ground, and other controlling factors.

On completion of the scraping operation i. e., when the body 10 has accumulated its full capacity of scraped material, the cable 53 is drawn, thereby raising the forward end of the body 10, including the cutter bar 21, clear of the ground and permitting the scraper to be drawn as a trailer to the point to which the accumulated material is to be dumped.

Referring now to Figs. 1, 4, 9, and 11 particularly, I will now describe the crowder mechanism for shifting the material accumulated above the cutter bar 21 toward the rear of the scraper body. The crowder proper is generally indicated at 55 and comprises a series of transversely extending plates 56 suitably secured together along their longitudinal edges, as by welding, to form a reinforced scoop or apron. Sides 58 and 59 (Fig. 11) are secured at the ends of the plates 56, these sides lying closely adjacent the scraper sides 13 and 14 of the scraper body, thus preventing lodging of rocks and other hard substances which would be likely to wedge between the crowder member and the scraper sides. These sides 58 and 59 extend forwardly of the plates 56 to form U shaped extensions 60 and 61, respectively. Rearwardly extending arms 62 and 63 are integrally formed with the extensions 60 and 61, respectively, these arms each terminating at the end thereof in a depending projection 64. The extensions 60 and 61 are of sufficient length to permit full movement of the crowder in its prescribed path without striking the forward edges of the scraper sides 13 and 14.

A link or arm 65 is pivotally connected at its upper end to an extension of the scraper side 13 by means of a stub shaft 67 on which link 65 is pivoted. The lower end of the link 65 is bifurcated and is pivotally connected to the arm 63, adjacent the rear end thereof, by a pin 68. A similar link 70 is pivotally connected to an extension of the scraper side 14 by means of a pin 72 coaxial with the pin 68 of link 65.

Figure 9:
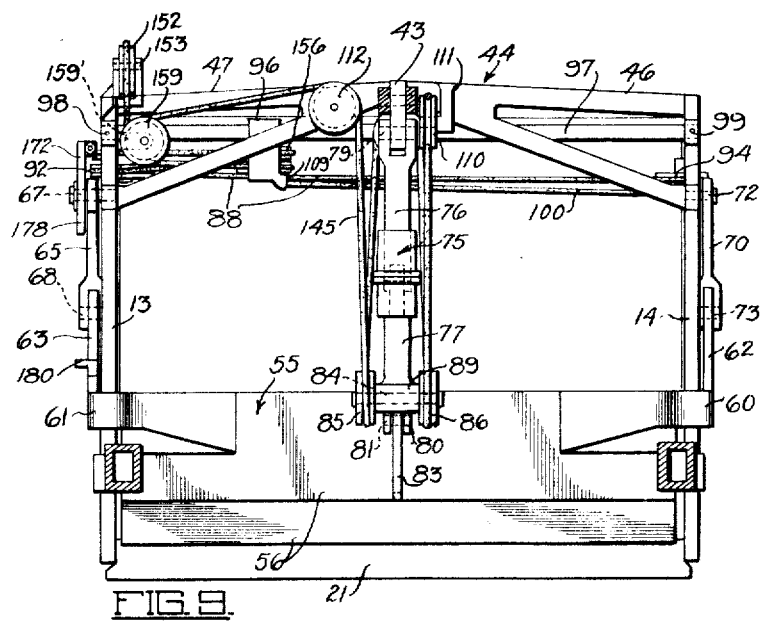
Fig. 9 is a front elevation view similar to that of Fig. 8 but is taken along the lines 9—9 of Fig. 4.

The crowder 55 is further pivotally supported by the scraper body through an articulated link generally indicated at 75. Link 75 comprises two sections or arms 76 and 77 having an offset pivotal connection 78 therebetween. The upper end of the section 76 is pivotally connected by means of a pin 79 to the piece 43. The lower end of the section 77 has an extension 80 formed integrally thereon, such extension having a pin 81 secured thereto and adapted to ride in a substantially vertically extending slot 82 formed in a guide plate 83 projecting forwardly from the central portion of the scoop 55 and suitably secured thereto. The adjacent ends of the link sections 76 and 77 of the articulated link 75 are adapted to normally contact each other thus permitting the link 75 to serve, in a coextensive position of sections 76 and 77, as a rigid member due to the offset condition of the pivotal connection 78 and the engagement of the adjacent ends of these sections. A shaft 84 extending through a boss 89 formed on the lower extremity of the link section 77, carries on either end thereof a pair of independently rotatable pulleys 85 and 86 (Figs. 9 and 11).

Figure 8:
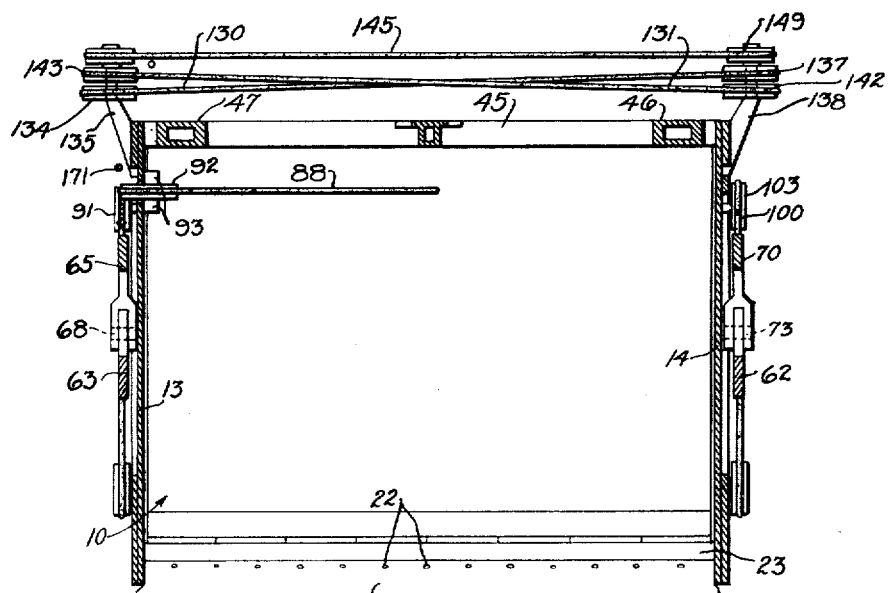
Fig. 8 is a transverse sectional elevation view through the forward end of the scraper body and is taken along the lines 8—8 of Fig. 4.

Referring now particularly to Figs. 1, 4, 8, 9, and 12, a pulley 87 is rotatably supported at the rear end of the scoop arm 63. A cable 88 secured to the scraper side 13 at 90 is passed around the circumference of the pulley 87, around a second pulley 91 rotatably secured to the side 13 above the pulley 87, and around a third pulley 92 rotatably mounted on the side 13 and extending through an opening formed therein. As shown in Fig. 8, the pulley 92 is rotatably journaled for movement about a vertical axis in bearings 93 suitably secured to the inner surface of the side 13. From pulley 92 the cable 88 extends transversely across the scraper, around a pulley 94 (Figs. 4 and 10) suitably journaled in bearings 95 for rotation about a vertical axis and extending through an aperture formed in the side wall 14. The end of cable 88, after passing around the pulley 94, is secured at 109 to a traveling differential pulley block 96. Block 96 is slidable transversely of the scraper along a guide bar 97 which is secured at its ends within projections 98 and 99 extending from the sides 13 and 14, respectively.

A second cable 100 (Fig. 4) is secured to the side 14 at 101 and passes around a rotatable pulley 102 carried on the end of the scoop arm 62. The cable 100 passes around a pulley 103 rotatably mounted on the side 14, thence around a pulley 104, directly below and coaxial with the pulley 94, and is suitably secured at its end to the block 96 at the same place cable 88 is secured.

The scoop 55 is urged forwardly of the cutter bar 21 by means of a spring tensioned cable 105 on each side of the scraper body. The cable 105 is secured at one end thereof to the projection 64, is passed around a pulley 106 rotatably mounted on the respective side of the scraper, and is suitably secured at 107 to the scraper side. A tension spring 108 is inserted in the two sections of the cable 105.

As shown in Fig. 9, a pulley 110 is rotatably supported through a bracket 111 by the pyramidal bracket 44 at a point adjacent the bearing piece 43. A second pulley 112 is also rotatably supported on the bracket 44 on the opposite side of the piece 43 to guide a scoop operating cable described hereinafter.

Describing now the dirt expelling or "draper" mechanism, the floor 11 of the scraper body comprises a door 113 transversely hinged along its forward end at 114 to the floor section 23. The rear end of door 113 is secured by means of bolts 115 to a sheet of flexible and pliant material 116. Such material is preferably of rubber or rubberized fabric which may be suitably reinforced. Both the door 113 and a portion of the sheet 116 are supported by a plurality of beams 136 extending between the rear wall 12 and the forward floor section 23. The sheet 116 is draped over the rear wall 12 of the scraper and also over a draper roll 117 rotatably supported in a carriage, generally indicated at 118, and is secured at its rear end at 119 to a swingable mount 120 which is pivotally secured on either end thereof at 121 to brackets 122 extending from the rear of the scraper body. Mount 120 serves to remove any slack produced in the sheet 116, the upper limit of its travel being indicated by the dotted lines in Fig. 4. The carriage 118 comprises a transversely extending frame consisting of a pair of cross beams 196 and 197 having U shaped depending bearing frames 123 and 124 at either end thereof. Pairs of flanged wheels 125 and 125' rotatably mounted in each of the bearing frames 123 and 124, are adapted to carry the carriage 118 along longitudinally extending tracks 126 and 127. These tracks are supported upwardly and outwardly of the scraper sides 13 and 14 by suitable brackets 128. As noted in Fig. 7, the roll 117 is rotatably journaled upon a shaft 129 secured at either end thereof in the bearing frames 123 and 124.

The carriage 118 is retained in transverse alignment throughout its travel along the tracks 126 and 127, through a cable guiding system comprising a pair of cables 130 and 131. The cable 130 is attached at one end thereof at 132 to the bearing frame 123 of the carriage 118, and passes around a pulley 133 rotatably supported on the rear end portion of the track 126. The cable 130 then passes forwardly around a second pulley 134 rotatably supported for movement about a vertical axis upon a bracket 135 extending upwardly from the scraper side 13. The cable 130 then passes transversely across the scraper body, around a third pulley 137, rotatably supported upon a bracket 138 carried by the scraper side 14, and is secured at 139 to the opposite bearing frame 124. The cable 131 is directed through a similar but opposite path to the cable 130 being secured at one end 140 (Fig. 2) to the frame 124. Cable 131 then passes around a pulley 141, similar to that of 133, on the extending end of the track 127, thence forwardly around a pulley 142 rotatably carried by the bracket 138 below and coaxial with the pulley 137. From pulley 142 cable 131 passes across the scraper and around a pulley 143, coaxial with pulley 134, and is secured at 144 to the frame 123 of the carriage 118. As shown in Fig. 8 the cables 130 and 131 cross each other while extending across the scraper body. It will be apparent from the foregoing that the cables 130 and 131 serve to retain the carriage 118 in a position parallel to itself throughout its entire travel along the tracks 126 and 127 without extending over the dirt containing portion of the scraper body.

The draper carriage 118 is adapted to be moved forwardly along the tracks 126 and 127 by means of a single cable 145. This cable is secured at 146 (Figs. 2, 4, and 12) to a bracket 147 extending upwardly from the cross bar 45 of the pyramidal bracket 44. Cable 145 passes around a rotatable pulley 148 mounted on a bracket 148' carried by the frame 124 of carriage 118, thence forwardly around a pulley 149 rotatably mounted on a bracket 149' extending upwardly from the forward end of the track 127, around a third pulley 150 rotatably mounted on a bracket 153 extending upwardly from the forward end of the track 126, around a fourth pulley 151 rotatably carried in a manner similar to that of 148 by the frame 123 of carriage 118. From pulley 151 the cable 145 again passes forwardly around a fifth pulley 152 rotatably mounted upon a bracket 153 extending from the forward upper edge of side 13. This cable then passes around a sixth pulley 154 rotatably carried on a bracket 155 also extending from the side 13 of the scraper, as noted in Figs. 9 and 10. Cable 145 then passes around an upper pulley 156 rotatably mounted in the sliding differential pulley block 96, around a pulley 157 rotatably supported from the side 13 by a bracket 157', around a lower pulley 158 rotatably mounted in block 96, around pulley 159 also rotatably supported from the side 13 through a bracket 159', and around pulleys 112, 85, 160, 86, and 110 in the order named. As noted in Fig. 4, the pulley 160 is carried in a swiveled block 162 depending from a cross piece 161, forming part of the pyramidal bracket 44, to accommodate for various angular positions of the cable 145 during operation thereof to move the scoop 55 through its prescribed path in a manner to be hereinafter described. The arrangement of the various cable connections and pulleys will be readily understood on reference to the diagrammatic perspective view in Fig. 12. The end of cable 145 extends forwardly and is preferably moved by a winch on the tractor device under the control of the operator.

Referring now to Figs. 1, 3, 5, and 6, the draper carriage 118 is normally retained in a locked position at the rear of the scraper body by means of a latch mechanism generally indicated at 163. In detail, this latch mechanism comprises a pair of dogs 164 and 165 (Fig. 6) securely mounted on either end of a transversely extending latch shaft 166. Shaft 166 is rotatably journaled in bearings 167 and 168 carried on the upper edges of the scraper sides 13 and 14, respectively. These dogs 164 and 165 are adapted to normally extend upwardly and engage the rear wheel of each set of wheels 125 and 125' on either side of the carriage 118, thus preventing movement of the carriage along the tracks 126 and 127 due to the pull of cable 145 until the latch mechanism is released. The dog 164 has a downwardly extending arm 169 to which is pivotally connected at 170 one end of a latch rod 171. The opposite end of the rod 171 is connected, as exemplified in Fig. 3, to the upper end of a cam arm 172. The forward end of the rod 171 is threaded to receive a pair of adjustable lock nuts 173 which abut a block 174 having an aperture therein rendering the block slidable along the rod 171. A compression spring 175 engaging at one end thereof the block 174, engages at its other end a sleeve 176 suitably secured to the rod 171 whereby the block 174 is urged against the lock nuts 173. Block 174 is pivotally connected through a pin connection 177 to the upper end of the cam arm 172. Arm 172 is pivotally supported intermediate its ends on the stub shaft 67, carrying the upper end of link 65. The lower end 178 of cam arm 172 is adapted to be engaged by a projection 180 (Figs. 1 and 9), extending from the arm 63, during the movement of the scoop 55. The latch mechanism 163 is normally retained in a locked condition by means of a suitable tension spring 197 connected between the rod 171 and the scraper side 13.

The operation of the crowder mechanism is as follows; during the cutting or scraping operation, the scoop 55 is preferably retained in the position shown in the diagrammatic view of Fig. 13 by permitting the spring tension cables 105 to withdraw the pulleys 87 and 102 as close as possible to the pulleys 106 thus holding the scoop 55 in an extreme forward position without releasing the cable 145 sufficiently to permit the scoop 55 to drop. Whenever it is desired to operate the scoop 55 to move the accumulated dirt rearwardly into the scraper body the cable 145 is released permitting the scoop 55 to drop of its own weight, hinging about the coaxial points 68 and 73 to allow the sections 76 and 77 of the articulated link 75 to assume a coextensive position, as shown in Fig. 14 thus completing the first step. After falling into this position, the link 75 will thereafter act as a single rigid link pivotal about its upper pin connection 79 for a predetermined movement of this link. As shown in Fig. 14, the scoop in this position is closely adjacent the upper surface of the ground being scraped, but in advance of the cutting bar 21.

Figure 13:
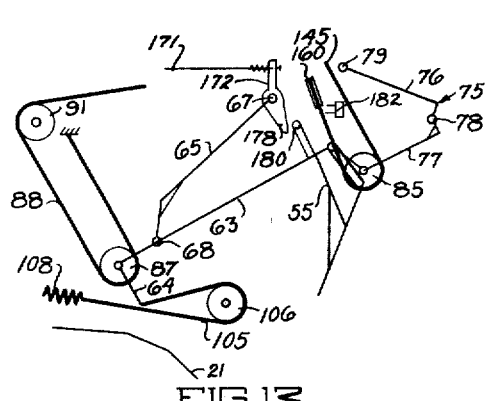
Figure 14:
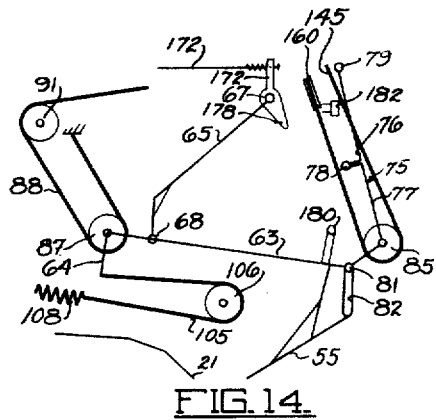
Figure 15:
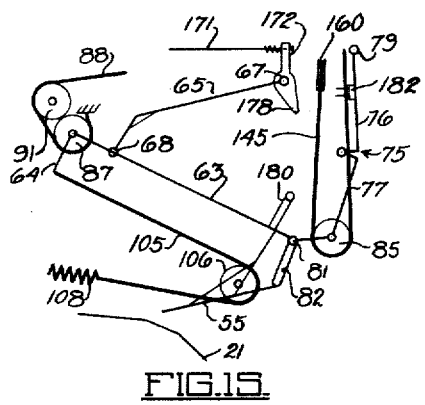
Figure 16:
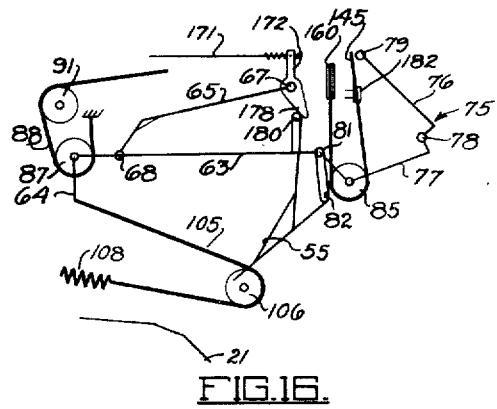

After the scoop has reached the position in Fig. 14 tension is applied to the cable 145 which, since the link 75 acts as a rigid single link, now has no effect on this link. However movement is transmitted to the differential pulley block 96, moving the same to the left, as will be apparent on reference to Figs. 10 and 12. In turn movement of block 96 acts upon the two cables 88 and 100 to draw the scoop 55 rearwardly while swinging on links 65 and 70 until the upper link section 76 of the articulated link 75 strikes a projection 182 in a form of a threadably adjustable headed rod 183 mounted in a bracket 184 depending from the cross piece 161 of the pyramidal bracket 44. Further rearward movement of the scoop 55, through the action of the cables 88 and 100, causes the link 75 to "break," as shown in Fig. 15, while permitting the lower pulleys 85 and 86 of link 75 to be drawn past a previous dead center position in line with the pivotal connection 78, and allowing this link 75 to be collapsed into the position shown in Fig. 16 due to the pull exerted by the cable 145 passing around the pulleys 85 and 86. By now releasing the cable 145 a certain amount, the spring tension cables 105 are allowed to swing the scoop assembly into its original normal position shown in Fig. 13, the projection 180 on arm 63 moving the cam arm 172 in a counter-clockwise direction during such movement until the arm 172 snaps past the projection 180. It is to be noted that during this movement of arm 172 no movement is transmitted to the draper retaining latch mechanism due to the fact that the spring 175 absorbs such movement.

Whenever it is desired to expel the accumulated dirt from within the scraper body, the scoop 55 is returned to its normal position, as shown in Fig. 13, if not already there. In this position it will be noted that the trip projection 180 is forward of the lower portion 178 of the cam arm 172. In this condition the cable 145 is drawn causing the cables 88 and 100, through the action of the differential block 96, to withdraw the ends of the arms 62 and 63 upwardly to the position shown in Fig. 16. This movement causes the projection 180 to engage and move the cam arm 172 in a clockwise direction thus engaging the lock nuts 173 to move the latch rod 171, and releasing the dogs 164 and 165. This unlatching action permits the cable 145 to draw the carriage 118 forwardly into and past the position shown by the dotted lines 185 (Fig. 4), there being no further movement of the scoop 55 due to the already collapsed condition of the link connections therefor. As the carriage 118 is moved forwardly the swingable mount 120, normally carrying a surplus amount of the sheet 116, is drawn upward into the position shown by the dotted lines in Fig. 4 because of the increased length of sheeting required. It will be noted that the action of the carriage 118 and the flexible sheet 116 is such as to cause a rolling motion to the dirt being expelled. This action requires much less effort to produce a forward movement of the dirt than the direct bodily movement heretofore employed in scrapers of this type.

The carriage 118 is returned to its original position on release of cable 145 by a spring tensioned cable 187, as shown in Figs. 4 and 17. One end of cable 187 is secured to a bar 188 extending between the bearing frames 123 and 124 of carriage 118 and is passed around a pulley 189 mounted on a bracket 190 suitably supported at the rear of the body 10. The cable 187 is then wound around a pulley 191 rotatably mounted to the rear wall 12 of the body 10, around a third spring controlled pulley 192, and is secured at 193 to the wall 12. A tension spring 194 is connected between the pulley 192 and a point 195 on the rear wall 12.

As shown in Fig. 4 and described hereinbefore, the pin 81 effecting the pivotal connection between the link 75 and the scoop 55, is adapted to ride along the slot 82 formed in the member 83 to accommodate for lumps of dirt, rocks, irregularities in the surface of the ground, etc., which may strike during its normal operating movement. The arrangement of this pin and slot connection thus permits the scoop 55 to start its rearward movement at any level determined by the surface of the material being scraped.

It is to be understood that, while I have herein described and illustrated a preferred form of my invention, the invention is not limited to the precise construction as herein described, but includes within its scope whatever changes fairly come within the spirit of the appended claims.

What is claimed is:

1. A scraping machine comprising a scraper body having a scraping edge associated therewith, means movable toward and away from said edge for moving material scraped by said edge into said body, means for ejecting scraped material from said body, locking means for restraining said ejecting means from movement, and means responsive to the movement of said first mentioned means for releasing said locking means.

2. A scraping machine in accordance with claim 1 wherein common operating means is provided for said first mentioned means and said ejecting means.

3. A scraping machine comprising a scraping body having a scraping edge associated therewith, a crowder member, means for guiding said member past said edge, means for ejecting material from said body, means normally locking said ejecting means against movement, and means responsive to the movement of said crowder member in one direction for releasing said locking means.

4. A scraping machine comprising a body, means forming a scraping edge associated with said body, a crowder member adapted to move scraped material in said body, an articulated link pivotally connected between said member and said body for guiding said member in a predetermined path, means for retaining said link rigid during a portion of the movement of said member, and means for breaking said link at a predetermined point on movement of said member.

5. In a scraping device, a scraper body, a material moving member adapted to move material in said body, an articulated link connected at one end thereof to said member, said link comprising a pair of link sections and a pivotal connection between said sections, means for pivotally supporting the other end of said link, means for moving said member and said link about the supported end of said link, means for maintaining said link rigid during a portion of the movement of said member, and means for preventing movement of the link section removed from said member at a predetermined point in the movement of said member whereby said member is adapted to be moved about said pivotal connection.

6. In a scraping machine comprising a scraper body having a cutting edge associated therewith, a crowder device for moving scraped material accumulated adjacent said edge into said body comprising a crowder member, an articulated link pivotally connected between said device and said body, said link comprising a pair of link sections and a pivotal connection therebetween, means for drawing said member toward and past said edge, and means for restraining one of said link sections as said member passes said cutting edge whereby said member is moved about said pivotal connection during the remainder of the movement of said crowder device.

7. In a road conditioning machine comprising a scraper body adapted to be drawn over the surface of material to be scraped and means forming a cutting edge associated with said body for scraping said material as said body is being drawn, the combination of means for moving scraped material accumulated adjacent said edge into said body comprising the combination of, a crowder member, an articulated link pivotally connecting said member and said body, said links being adapted to guide said member past said cutting edge in a predetermined path, and means for engaging the section of said first mentioned link which is pivotally connected to said body when said member passes a predetermined point in the path of movement thereof.

8. Means for removing material from within scraper bodies and the like comprising a sheet adapted to be flexed in a longitudinal direction, means for securing one end of said sheet to the floor of a material containing body, means for supporting the other end of said sheet adjacent the top of said body, roller means engaging the under surface of said sheet, and means for moving said roller means longitudinally of said body and in rolling engagement with said sheet.

9. In a scraping machine, a material containing body having bottom, side, and end walls, a flexible sheet, means for securing one end of said sheet on the bottom wall of said body, means for supporting the other end of said sheet adjacent the upper end of the end wall of said body whereby said sheet is adapted to drape over said bottom and end walls, a carriage, means for supporting said carriage for movement along the top of said body, said carriage being adapted to movably engage said sheet, and means for moving said carriage longitudinally of said body.

10. A scraping machine comprising a scraper body having a scraper edge associated therewith, means movable toward and away from said edge for moving material scraped by said edge into said body, means for ejecting scraped material from said body, locking means for restraining said ejecting means from movement, an arm, means pivotally supporting said arm, means connecting said arm with said locking means to unlock said locking means on movement of said arm, and means operatively connected to said first mentioned means and adapted to move said arm.

11. A scraping machine according to claim 10 comprising means for rendering said connecting means ineffective to release said locking means on movement of said arm in one direction.

12. A scraping machine comprising a scraper body having a scraper edge associated therewith, a crowder member, means adapted to move said member rearwardly to move material scraped by said edge into said body, a second means adapted to move said member upwardly after a predetermined rearward move thereof, and common means for operating said first two mentioned means.

13. A scraping machine comprising a scraper body having a scraper edge associated therewith, a crowder member means for guiding said member in said body, cable means for moving said member rearwardly to move material scraped by said edge into said body, a second cable means for moving said member upwardly, and means for rendering last mentioned cable means ineffective for a predetermined rearward movement of said member, and an operable connection between said two mentioned cable means.

14. In a scraping machine, a body, a member for moving scraped material in said body, an arm section on said member, a second arm section pivotally connected between said first mentioned arm section and said body to form an articulated arm, a second articulated arm pivotally connected between said member and said body forward of said first mentioned articulated arm, means for effecting a collapsing movement of said articulated arms, and means preventing collapse of one of said articulated arms until the other of said articulated arms has collapsed a predetermined amount.

15. In a scraping machine, a body, a member for moving scraped material in said body, means for moving said member in one direction, means for moving said member in another direction, common operating means for said first two mentioned means, and differential means whereby one of said first two mentioned means may be operated independently of the other.

16. Means for moving material in a scraper body or the like comprising a flexible material support, means for securing one end of said support at the bottom of said body, means for supporting the other end of said flexible support above the bottom of said body, means movably supporting a portion of said flexible support above the bottom of said body, and means for moving said last mentioned means longitudinally of said body along said flexible support.

17. A scraping machine comprising a scraper body, a flexible material support in said body, means for supporting one end of said support adjacent one end of said body, means for supporting the other end of said support adjacent the other end of said body, roller means supporting said support intermediate the ends thereof and at a level higher than one of the supported ends of said flexible support, and means for moving said roller means toward said last mentioned supported end.

18. A scraping machine according to claim 17 comprising means for removing slack in said flexible material support in different positions of said roller means.

19. A scraping machine comprising a scraper body having a scraping edge associated therewith, a crowder member, means adapted to move said member rearwardly to move material scraped by said edge into said body, a second means adapted to move said member upwardly after a predetermined rearward movement thereof, common power means for said first two mentioned means, and means whereby the mechanical advantage between said power means and one of said first two mentioned means is greater than the mechanical advantage between said power means and the other of said two mentioned means.

20. A machine of the class described comprising a scraper body, means forming a scraping edge associated with the front of said body and adapted to scrape material thereunder on forward movement of said body, a crowder member adapted to move material scraped by said edge into said body, link means for guiding said member past said edge from a position forward of said edge to a position rearward of said edge for moving said scraped material, and means controlling said link means for guiding said member in a curve of relatively long radius from said forward position to a position adjacent said edge and for guiding said member in a curve of relatively short radius upwardly from said last mentioned position to said rearward position.

21. A machine according to claim 20 wherein said link means comprises an articulated link pivotally connected between said body and said crowder member.

22. A machine according to claim 20 wherein said link means comprises an articulated link pivotally connected between said body and said crowder member and wherein said last mentioned means comprises means for preventing movement of one section of said link at a predetermined point in the path of movement of said link.

GORDON E. DANIELS.

CERTIFICATE OF CORRECTION.

Patent No. 2,172,672.  September 12, 1939.

GORDON E. DANIELS.

It is hereby certified that error appears in the printed specification of the above numbered patent requiring correction as follows: Page 1, second column, line 18, for the word "inoperatable" read --operatable--; and that the said Letters Patent should be read with this correction therein that the same may conform to the record of the case in the Patent Office.

Signed and sealed this 2nd day of July, A. D. 1940.

(Seal)

Henry Van Arsdale,
Acting Commissioner of Patents.

said edge to a position rearward of said edge for moving said scraped material, and means controlling said link means for guiding said member in a curve of relatively long radius from said forward position to a position adjacent said edge and for guiding said member in a curve of relatively short radius upwardly from said last mentioned position to said rearward position.

21. A machine according to claim 20 wherein said link means comprises an articulated link pivotally connected between said body and said crowder member.

22. A machine according to claim 20 wherein said link means comprises an articulated link pivotally connected between said body and said crowder member and wherein said last mentioned means comprises means for preventing movement of one section of said link at a predetermined point in the path of movement of said link.

GORDON E. DANIELS.

CERTIFICATE OF CORRECTION.

Patent No. 2,172,672. September 12, 1939.

GORDON E. DANIELS.

It is hereby certified that error appears in the printed specification of the above numbered patent requiring correction as follows: Page 1, second column, line 18, for the word "inoperatable" read --operatable--; and that the said Letters Patent should be read with this correction therein that the same may conform to the record of the case in the Patent Office.

Signed and sealed this 2nd day of July, A. D. 1940.

(Seal)

Henry Van Arsdale,
Acting Commissioner of Patents.